United States Patent
Fan et al.

(10) Patent No.: US 7,288,215 B2
(45) Date of Patent: Oct. 30, 2007

(54) METHOD OF MAKING NARROW-BAND UVB-EMITTING PHOSPHORS

(75) Inventors: Chen-Wen Fan, Sayre, PA (US); Thomas M. Snyder, Laceyville, PA (US); Eric A. Thomason, Towanda, PA (US)

(73) Assignee: Osram Sylvania Inc., Danvers, MA (US)

( * ) Notice: Subject to any disclaimer, the term of this patent is extended or adjusted under 35 U.S.C. 154(b) by 301 days.

(21) Appl. No.: 10/907,350

(22) Filed: Mar. 30, 2005

(65) Prior Publication Data

US 2006/0219978 A1 Oct. 5, 2006

(51) Int. Cl.
*C09K 11/78* (2006.01)
(52) U.S. Cl. .............................. 252/301.4 R
(58) Field of Classification Search .......... 252/301.4 R
See application file for complete search history.

(56) References Cited

U.S. PATENT DOCUMENTS

| | | | | |
|---|---|---|---|---|
| 4,319,161 A | * | 3/1982 | Looye et al. ............... | 313/486 |
| 5,154,852 A | * | 10/1992 | Chau .................... | 252/301.4 P |
| 5,776,368 A | * | 7/1998 | Chau .................... | 252/301.4 R |
| 6,007,741 A | * | 12/1999 | Hunt et al. ........... | 252/301.4 R |

FOREIGN PATENT DOCUMENTS

| | | |
|---|---|---|
| EP | 0 798 361 A1 | 10/1997 |
| EP | 1 475 428 A2 | 11/2004 |
| GB | 2 124 243 A | 2/1984 |

OTHER PUBLICATIONS

U.S. Appl. No. 10/907,349, filed Mar. 30, 2005, Fan et al.

* cited by examiner

*Primary Examiner*—C. Melissa Koslow
(74) *Attorney, Agent, or Firm*—Robert F. Clark

(57) ABSTRACT

A method is provided for making narrow-band, UVB-emitting, (Y,Gd,Ce,Pr)Mg borate phosphors. The method involves the use of a mixed oxide co-precipitate which is combined with MgO and boric acid and fired twice to form the borate phosphor. The mixed oxide co-precipitate is formed by dissolving sources of Y, Gd, Ce, and optionally Pr, in an acid solution. Oxalic acid or ammonia is added to the solution (or vice versa) to form a co-precipitate of oxalates or hydroxides that are further fired to obtain a mixed oxide co-precipitate. The use of the mixed oxide co-precipitate improves homogeneity and yields a phosphor having a higher brightness with very little or no sticking between the fired cakes and the firing crucibles.

16 Claims, No Drawings

METHOD OF MAKING NARROW-BAND UVB-EMITTING PHOSPHORS

TECHNICAL FIELD

This invention relates to methods of making gadolinium-activated pentaborate phosphors, which are narrow-band ultraviolet emitting phosphors typically used in low-pressure mercury vapor discharge lamps for phototherapy purpose.

BACKGROUND OF THE INVENTION

The use of ultraviolet (UV) radiation for phototherapy is well established. In fact, UV therapy is now involved in the treatment of more than 40 types of skin diseases and disorders such as psoriasis, vitiligo and eczema. Phototherapy studies of UVB wavelengths between 260 nm and 320 nm found that a narrow-band UVB emission centered at approximately 312 nm is most effective for phototherapy while at the same time limiting undesirable erythemal effects. Since the skin's erythemal (or sunburning sensitivity) is at its maximum at about 297 nm, a narrow-band emission at about 312 nm allows a patient to have longer treatment times before an erythemal response appears.

The $Gd^{3+}$ $^6P_{7/2} \rightarrow ^8S$ transitions are ideal for 312 nm narrow-band emissions. However, f-f transitions of rare earths, being parity forbidden, are very weak and the use of a sensitizer is necessary to obtain a useful emission intensity. One of the first narrow-band UVB phosphors to be developed was sensitized with bismuth, e.g., $(Gd_{0.5},La_{0.487})B_3O_6$:$Bi_{0.013}$. On excitation by 254 nm radiation, this borate phosphor emits the characteristic radiation with a very narrow band centered on 312 nm. However, because of the toxicity of the bismuth sensitizer, other narrow-band UVB phosphors were developed, in particular $(Gd_{0.45},Y_{0.5})MgB_5O_{10}$:$Ce_{0.05}$, which is described in U.S. Pat. No. 4,319,161.

The method of making the Ce-sensitized phosphor described in U.S. Pat. No. 4,319,161 involves dry mixing oxides of Gd, Y, Ce, Mg and boric acid, and then subjecting the mixture to three firings in a weakly reducing atmosphere. Later in U.S. Pat. No. 6,007,741, Hunt et al. proposed an improved process to prepare the $(Gd_{0.45},Y_{0.5})MgB_5O_{10}$:$Ce_{0.05}$ phosphor by milling the reactants in a saturated aqueous solution of magnesia and boric acid prior to firing three times in a slightly reducing atmosphere. The later method was developed to increase the homogeneity of the fired phosphor cake and reduce the tendency of the fired cake to stick to the firing boats. However, three firing steps were still needed.

SUMMARY OF THE INVENTION

It is an object of this invention to obviate the disadvantages of the prior art.

It is a further object of this invention to provide an improved method of making narrow-band UVB-emitting phosphors.

In accordance with these and other objects of the invention, there is provided a method of making a narrow band UVB-emitting phosphor which has a composition that may be represented by the general formula $(Y_{1-x-y-z}Gd_xCe_yPr_z)MgB_5O_{10}$ where x has a value in a range from 0.02 to 0.80, y has a value in a range from 0.01 to 0.97, and z has a value in a range from 0 to 0.05 and $x+y+z<1$. More preferably, x has a value in a range from 0.3 to 0.6, y has a value in a range from 0.02 to 0.2, and z has a value in a range from 0.002 to 0.02.

The method of this invention involves the use of a mixed oxide co-precipitate which is combined with MgO and boric acid and fired twice to form the borate phosphor. The mixed oxide co-precipitate is formed by dissolving sources of Y, Gd, Ce, and optionally Pr, in an acid solution. Oxalic acid or ammonium hydroxide is added to the solution (or vice versa) to form a co-precipitate of oxalates or hydroxides that are further fired to obtain a mixed oxide co-precipitate, preferably by firing in air at about 750° C. The use of the mixed oxide co-precipitate improves homogeneity and yields a phosphor having a higher brightness with very little or no sticking between the fired cakes and the firing crucibles.

DETAILED DESCRIPTION OF THE INVENTION

For a better understanding of the present invention, together with other and further objects, advantages and capabilities thereof, reference is made to the following disclosure and appended claims.

The preparation of the (Y,Gd,Ce,Pr)Mg borate phosphor utilizes a new method in which a previously prepared co-precipitate of (Y,Gd,Ce,Pr) oxide is combined with magnesia and boric acid and fired twice in a slightly reducing atmosphere, such as a nitrogen/hydrogen atmosphere. This is different from the prior art method which combines separate oxide powders with boric acid. The new method results in greater homogeneity of the fired cake and subsequently a higher brightness. In addition, the new method requires only two firing steps and provides no or very little sticking of the fired cake to the firing boats.

The present invention will be described in further detail with reference to the following examples. However, it should be understood that the present invention is by no means restricted to such specific examples.

EXAMPLE 1

About 100 grams of $(Gd_{0.45},Y_{0.5})MgB_5O_{10}$:$Ce_{0.05}$ phosphor were made according to the method described in U.S. Pat. No. 6,007,741 (Comparative Example). A second phosphor (Inventive Example) having the same formula was prepared from a mixed (Y,Gd,Ce) oxide co-precipitate according to the method of this invention. The oxide co-precipitate was formed by first dissolving 43.42 grams of $Ce(NO_3)_3 \cdot 6H_2O$ in 1500 ml of an aqueous solution containing 380 ml of concentrated nitric acid. The solution was continuously stirred and heated to 95° C. When the solution became clear, 113.47 grams of $Y_2O_3$ and 163.93 grams of $Gd_2O_3$ were added into solution slowly. The mixed solution was kept at the temperature from 85° C. to 95° C. and stirred until clear. The solution was then cooled to 60° C. and slowly poured into an oxalic acid solution containing 416 grams of oxalic acid in 1500 ml of deionized water, which was kept at a temperature from 50° C. to 60° C. and a pH from 1.0 to 2.0. A precipitate formed immediately and the milky white solution was agitated continuously at the temperature from 50° C. to 60° C. for one hour. After settling, the supernate was decanted and the oxalate co-precipitate was resuspended in cold water and agitated for 10 minutes. This procedure was repeated until the solution reached a pH of 4. After a final decantation, the oxalate co-precipitate was placed in a drying oven at 65° C. for 12 hours. The dried oxalate was then fired for 3 hours at 750° C. in air to form the mixed oxide co-precipitate with the formula of $(Gd_{0.45}, Y_{0.5}, Ce_{0.05})_2O_3$. A 131.6 gram amount of the oxide co-precipitate was thoroughly mixed with 36.88 grams of MgO and 333.88 grams of $H_3BO_3$ (an excess of 0.01 mole magnesia and 0.2 mole boric acid were used). The mixture was then fired twice in an alumina crucible, preferably each time for 2 to 3 hours at 1020° C. to 1060° C. in a slightly reducing 98% $N_2$/2% $H_2$ atmosphere. The fired cake was ground and sieved to −35 mesh between firings. The double-fired cake was then wet milled with 5 mm YTZ beads for 2 hours, washed, filtered, dried, and screened to −300 mesh to produce the $(Gd_{0.45},Y_{0.5})MgB_5O_{10}:Ce_{0.05}$ phosphor.

Phosphor samples were packed into plaques and excited by 254 nm radiation from a mercury discharge. The peak emission of each sample was measured at 312 nm and the integrated area under the emission curve from 310 nm to 316 nm was also calculated. The data are reported in Table 1 relative to a standard Bi-sensitized borate phosphor, $(Gd_{0.5}, La_{0.487})B_3O_6:Bi_{0.013}$. The data indicate that the Ce-sensitized borate phosphor made by the co-precipitate method of this invention has a higher relative plaque brightness than the Comparative Example prepared according to U.S. Pat. No. 6,007,741.

TABLE 1

| Phosphor | Rel. Brightness, % peak height @ 312 nm | Rel. Brightness, % integrated from 310 nm to 316 nm |
|---|---|---|
| $(Gd_{0.45},Y_{0.5})MgB_5O_{10}:Ce_{0.05}$ Comparative Example | 91.1 | 101.3 |
| $(Gd_{0.45},Y_{0.5})MgB_5O_{10}:Ce_{0.05}$ Inventive Example | 95.5 | 105.7 |

EXAMPLE 2

A Ce and Pr co-sensitized borate phosphor was prepared with a composition of $(Gd_{0.45},Y_{0.49},Ce_{0.05},Pr_{0.01})MgB_5O_{10}$. The phosphor was produced in the same manner as $(Gd_{0.45}, Y_{0.5})MgB_5O_{10}:Ce_{0.05}$ phosphor in Example 1, except that 111.2 grams of $Y_2O_3$, 163.93 grams of $Gd_2O_3$, 43.42 grams of $Ce(NO_3)_3 \cdot 6H_2O$, and 3.38 grams of $Pr_4O_7$ were dissolved by dilute nitric acid and an excess of oxalic acid was added thereto to obtain co-precipitate oxalates of Y, Gd, Ce and Pr. The co-precipitate was filtered, dried and fired to form the oxide co-precipitate with the formula of $(Gd_{0.45},Y_{0.49},Ce_{0.05},Pr_{0.01})_2O_3$. A 131.6 gram amount of the mixed oxide co-precipitate was thoroughly mixed with 36.88 grams of magnesia and 333.88 grams of boric acid and mixture was fired and prepared as in Example 1.

Tables 1 and 2 compare the UVB irradiance output (microwatts per square centimeter) from low-pressure mercury discharge lamps (F72T12) containing Ce and Pr co-sensitized borate phosphor of Example 2 and the Ce-sensitized phosphor of Example 1. The UVB irradiance of each lamp was measured through a filter on a 12-inch section from a 12-inch distance. The reported irradiance is calculated from the integrated area under the emission curve from 307 nm to 317 nm. The 100-watt fluorescent lamps were operated at 430 mA (Table 1) and 800 mA (Table 2) for up to 100 hours. As can be seen, the lamp data show that the UVB irradiance output increases significantly by substituting Pr into (Y,Gd,Ce)Mg borate matrix. The results also indicate that the Ce and Pr co-sensitized phosphor made according to this invention has a better maintenance in lamps, especially operated when at 430 mA. (The maintenance is defined as the 100-hour irradiance output divided by 0 hour irradiance output and multiplied by 100%, (100 hour/0 hour)×100%.) Moreover, the peak position does not shift when the Pr sensitizer is doped into the borate phosphor. The enhanced narrow-band emission remains centered at about 312 nm.

TABLE 2

| Phosphor | Irradiance at 0 hours | Irradiance at 100 hours | Maintenance (%) |
|---|---|---|---|
| A - Lamps Operated at 430 mA. | | | |
| (Y, Gd, Ce)Mg Borate | 123.1 | 102.8 | 83.5 |
| (Y, Gd, Ce, Pr)Mg Borate | 132.6 | 116.7 | 88.0 |
| B - Lamps Operated at 800 mA | | | |
| (Y, Gd, Ce)Mg Borate | 156.3 | 134.8 | 86.2 |
| (Y, Gd, Ce, Pr)Mg Borate | 172.4 | 148.5 | 86.1 |

While there has been shown and described what are at the present considered the preferred embodiments of the invention, it will be obvious to those skilled in the art that various changes and modifications may be made therein without departing from the scope of the invention as defined by the appended claims.

What is claimed is:

1. A method of making a narrow-band UVB-emitting phosphor having a composition represented by a general formula $(Y_{1-x-y-z}Gd_xCe_yPr_z)MgB_5O_{10}$ where x has a value in a range from 0.02 to 0.80, y has a value in a range from 0.01 to 0.97, and z has a value in a range from 0 to 0.05 and x+y+z<1, the method comprising:
  (a) dissolving a source of Y, Gd, Ce, and optionally Pr, in an acidic solution;
  (b) adding ammonium hydroxide to form a hydroxide co-precipitate containing Y, Gd, Ce, and optionally Pr, from the acidic solution;
  (c) firing the hydroxide co-precipitate to form an oxide co-precipitate;
  (d) combining the oxide co-precipitate with magnesium oxide and boric acid to form a mixture; and
  (e) firing the mixture twice in a slightly reducing atmosphere to form the phosphor.

2. The method of claim 1 wherein the oxide co-precipitate is formed by firing the hydroxide co-precipitate in air.

3. The method of claim 1 wherein the acidic solution is an aqueous solution of nitric acid.

4. The method of claim 1 wherein the mixture in step (e) is fired in a $N_2/H_2$ atmosphere.

5. The method of claim 1 wherein a 0.01 mole stoichiometric excess of magnesium oxide and a 0.2 mole stoichiometric excess of boric acid are combined with the oxide co-precipitate to form the mixture.

6. The method of claim 1 wherein the source of Ce is cerium nitrate, the source of Gd is gadolinium oxide, the source of Y is yttrium oxide, and the source of Pr is praseodymium oxide.

7. The method of claim 1 wherein the mixture in step (e) is fired for 2 to 3 hours at 1020° C. to 1060° C.

8. A method of making a narrow-band UVB-emitting phosphor having a composition represented by a general formula $(Y_{1-x-y-z}Gd_xCe_yPr_z)MgB_5O_{10}$ where x has a value in a range from 0.02 to 0.80, y has a value in a range from 0.01 to 0.97, and z has a value in a range from 0 to 0.05 and x+y+z<1, the method comprising:
(a) dissolving a source of Y, Gd, Ce, and optionally Pr, in an acidic solution;
(b) adding oxalic acid to form an oxalate co-precipitate containing Y, Gd, Ce, and optionally Pr, from the acidic solution, wherein the acidic solution is maintained at a temperature from 50° C. to 60° C. and a pH from 1.0 to 2.0 when forming the oxalate co-precipitate;
(c) firing the oxalate co-precipitate to form an oxide co-precipitate;
(d) combining the oxide co-precipitate with magnesium oxide and boric acid to form a mixture; and
(e) firing the mixture twice in a slightly reducing atmosphere to form the phosphor.

9. A method of making a narrow-band UVB-emitting phosphor having a composition represented by a general formula $(Y_{1-x-y-z}Gd_xCe_yPr_z)MgB_5O_{10}$ where x has a value in a range from 0.03 to 0.6, y has a value in a range from 0.02 to 0.2, and z has a value in a range from 0.002 to 0.02 and x+y+z<1, the method comprising:
(a) dissolving a source of Y, Gd, Ce, and optionally Pr, in a nitric acid solution;
(b) forming an oxalate co-precipitate containing Y, Gd, Ce, and optionally Pr, from the solution;
(c) firing the oxalate co-precipitate to form an oxide co-precipitate;
(d) combining the oxide co-precipitate with magnesium oxide and boric acid to form a mixture; and
(e) firing the mixture twice at a temperature from 1020° C. to 1060° C. in a slightly reducing atmosphere to form the phosphor.

10. The method of claim 9 wherein the oxalate co-precipitate is formed by adding the solution to an oxalic acid solution at a temperature from 50° C. to 60° C. and a pH from 1.0 to 2.0.

11. The method of claim 10 wherein the oxalate co-precipitate is fired in air at about 750° C. to form the oxide co-precipitate.

12. The method of claim 9 wherein the source of Ce is cerium nitrate, the source of Gd is gadolinium oxide, the source of Y is yttrium oxide, and the source of Pr is praseodymium oxide.

13. A method of making a narrow-band UVB-emitting phosphor having a composition represented by a general formula $(Y_{1-x-y-z}Gd_xCe_yPr_z)MgB_5O_{10}$ where x has a value in a range from 0.3 to 0.6, y has a value in a range from 0.02 to 0.2, and z has a value in a range from 0.002 to 0.02,and x+y+z<1, the method comprising:
(a) dissolving a source of Y, Gd, Ce, and optionally Pr, in an acidic solution;
(b) forming an oxalate or hydroxide co-precipitate containing Y, Gd, Ce, and optionally Pr, from the acidic solution;
(c) firing the oxalate or hydroxide co-precipitate to form an oxide co-precipitate;
(d) combining the oxide co-precipitate with magnesium oxide and boric acid to form a mixture; and
(e) firing the mixture twice in a slightly reducing atmosphere to form the phosphor.

14. A method of making a narrow-band UVB-emitting phosphor having a composition represented by a general formula $(Y_{1-x-y-z}Gd_xCe_yPr_z)MgB_5O_{10}$ where x has in a range from 0.02 to 0.80, y has a value in a range from 0.01 to 0.97, and z has a value in a range from 0 to 0.05 and x+y+z<1, the method comprising:
(a) dissolving a source of Y, Gd, Ce, and optionally Pr, in an acidic solution;
(b) adding oxalic acid or ammonium hydroxide to form an oxalate or hydroxide co-precipitate containing Y, Gd, Ce, and optionally Pr, from the acidic solution;
(c) firing the oxalate or hydroxide co-precipitate to form an oxide co-precipitate;
(d) combining the oxide co-precipitate with a 0.01 mole stoichiometric excess of magnesium oxide and a 0.2 mole stoichiometric excess of boric acid to form a mixture; and
(e) firing the mixture twice in a slightly reducing atmosphere to form the phosphor.

15. The method of claim 13 wherein the oxalate co-precipitate is formed by adding the solution to an oxalic acid solution at a temperature from 50° C. to 60° C. and a pH from 1.0 to 2.0.

16. The method of claim 13 wherein a 0.01 mole stoichiometric excess of magnesium oxide and a 0.2 mole stoichiometric excess of boric acid are combined with the oxide co-precipitate to form the mixture.

* * * * *